(12) United States Patent
Hanes et al.

(10) Patent No.: US 12,513,118 B2
(45) Date of Patent: Dec. 30, 2025

(54) ARTIFICIAL INTELLIGENCE (AI) CONFIDENTIALITY PROXY TO SECURE AI DATA SETS

(71) Applicant: Cisco Technology, Inc., San Jose, CA (US)

(72) Inventors: M. David Hanes, Lewisville, NC (US); Vivek Kumar Singh, Cary, NC (US); Gonzalo Salgueiro, Raleigh, NC (US); Derek William Engi, Ferndale, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 144 days.

(21) Appl. No.: 18/359,060

(22) Filed: Jul. 26, 2023

(65) Prior Publication Data
US 2024/0388571 A1 Nov. 21, 2024

Related U.S. Application Data

(60) Provisional application No. 63/502,703, filed on May 17, 2023.

(51) Int. Cl.
*G06F 21/62* (2013.01)
*H04L 9/40* (2022.01)

(52) U.S. Cl.
CPC ...... *H04L 63/0281* (2013.01); *G06F 21/6245* (2013.01); *H04L 63/0245* (2013.01); *H04L 63/0263* (2013.01); *H04L 63/0892* (2013.01); *H04L 2463/102* (2013.01)

(58) Field of Classification Search
CPC ............ H04L 63/0281; H04L 63/0245; H04L 63/0263; H04L 63/0892; H04L 2463/102; G06F 21/6245; G06F 21/57
See application file for complete search history.

(56) References Cited

U.S. PATENT DOCUMENTS

| 7,093,286 B1 * | 8/2006 | King | H04L 63/04 380/271 |
| 2011/0126290 A1 * | 5/2011 | Krishnamurthy | H04L 63/102 726/26 |
| 2014/0149322 A1 | 5/2014 | LaVoie et al. | |

(Continued)

FOREIGN PATENT DOCUMENTS

| EP | 4141719 A1 | 3/2023 | |
| ES | 2744841 T3 * | 2/2020 | G06F 21/335 |
| KR | 2021094323 A * | 7/2021 | |

OTHER PUBLICATIONS

Microsoft: "Data Classification & Sensitivity Label Taxonomy", Microsoft Service Assurance, Mar. 2, 2023, pp. 1-3.

(Continued)

*Primary Examiner* — Amie C. Lin
(74) *Attorney, Agent, or Firm* — Edell, Shapiro & Finnan, LLC

(57) ABSTRACT

A system and method for an artificial intelligence (AI) confidentiality proxy that can protect a network from the transferal of sensitive AI data sets to outside AI systems. A data contract is established between the proxy and outside AI systems could function as well as user personas for additional protection. This system can also integrate with the network and provide security policy content and inspection rules.

20 Claims, 5 Drawing Sheets

(56) References Cited

U.S. PATENT DOCUMENTS

| | | | |
|---|---|---|---|
| 2015/0363600 A1* | 12/2015 | Jin | G06F 21/6245 |
| | | | 726/26 |
| 2018/0295134 A1* | 10/2018 | Gupta | H04L 67/56 |
| 2020/0067906 A1 | 2/2020 | Florez et al. | |
| 2020/0172920 A1* | 6/2020 | Wang | C07K 14/165 |
| 2021/0377310 A1 | 12/2021 | Fernando et al. | |
| 2022/0060328 A1* | 2/2022 | Li | H04L 9/0891 |
| 2022/0414237 A1 | 12/2022 | Lally et al. | |
| 2023/0011742 A1* | 1/2023 | Merritt | H04L 9/065 |

OTHER PUBLICATIONS

Microsoft: "Privacy Preserving Machine Learning: Maintaining Confidentiality and Preserving Trust", Microsoft Research Blog, Nov. 9, 2021, 10 Pages.

\* cited by examiner

ARTIFICIAL INTELLIGENCE (AI) CONFIDENTIALITY PROXY TO SECURE AI DATA SETS

CROSS REFERENCE TO RELATED APPLICATION

This application claims priority to U.S. Provisional Application No. 63/502,703, filed May 17, 2023, the entirety of which is incorporated herein by reference.

TECHNICAL FIELD

The present disclosure relates to managing data to be provided to artificial intelligence (AI) services/entities.

BACKGROUND

Securing AI data sets and what AI entities can consume AI data sets is a challenge facing AI usage in the enterprise space. AI data sets created from confidential or highly confidential data should not be sent to an insecure and/or untrusted AI system/service. These AI services are often in the cloud and security for the data sets can vary. These data sets can be quite valuable and competitors or bad actors with access to these data sets would be a major security breach. Currently, enterprises rely mainly on an honor system to keep its confidential data off of third party AI systems.

DESCRIPTION OF EXAMPLE EMBODIMENTS

Overview

Presented herein are techniques to validate the confidentiality of an artificial intelligence (AI) data set, authenticate its destination AI entity, and then permit or deny the data set transfer. An AI confidentiality proxy is provided that can protect a network from the transferal of sensitive data to outside AI systems/services. A data contract is established between the proxy and outside AI systems/services. This AI confidential proxy can also integrate with the network and provide security policy content and inspection rules.

In one form, a method is provided that is performed by a proxy that is in communication with one or more users in an enterprise network seeking to send data to one or more artificial intelligence services external to the enterprise network. The method includes: sending to each of the one or more artificial intelligence services, a message including information describing a data contract that indicates restrictions associated with data received from the enterprise network; receiving from each of the one or more artificial intelligence services an acknowledgement message indicating acknowledgement that each of the one or more artificial intelligence services will comply with the restrictions of the data contract; obtaining a request to send data from a particular user of the one or more users to a particular artificial intelligence service of the one or more artificial intelligence services; and forwarding the data from the particular user to the particular artificial intelligence service.

EXAMPLE EMBODIMENTS

A system, method and apparatus are provided involving an AI confidentiality proxy. The AI confidentiality proxy can use AI models and/or heuristics to identify confidential AI training data and authenticate that the destination of the data is approved and trusted for use by an AI service.

Figure 1:
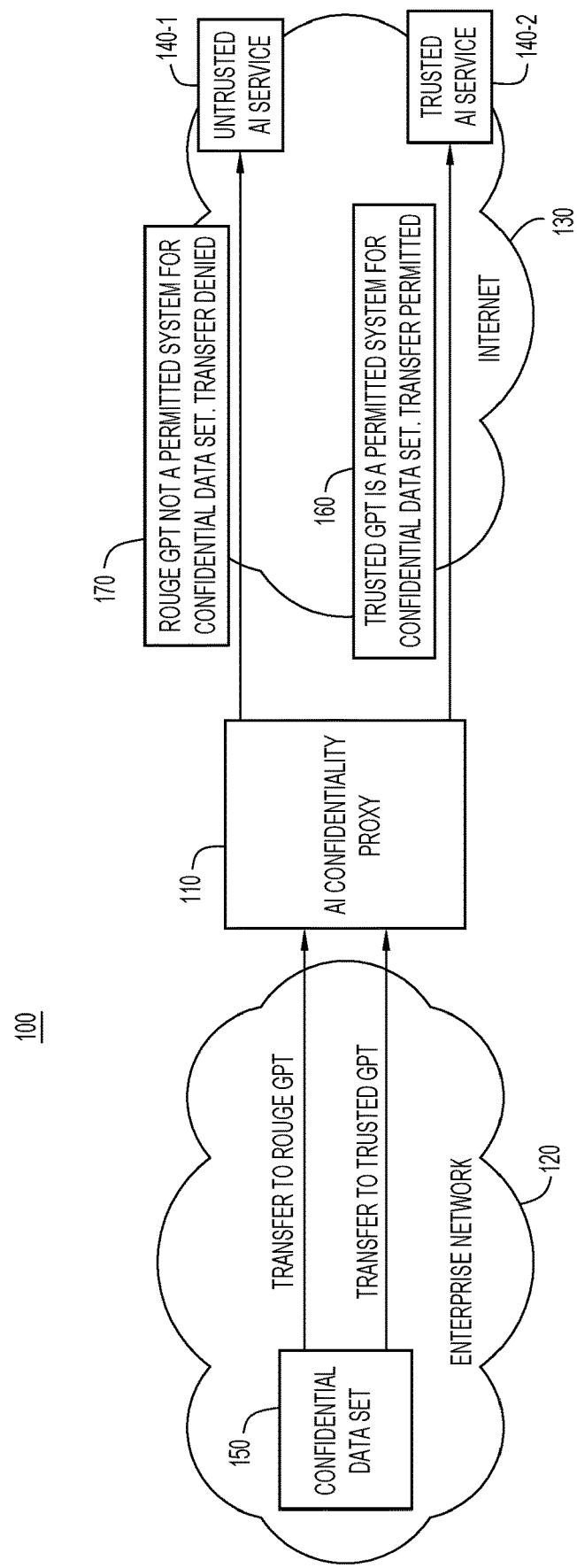
FIG. 1 is a high-level flow diagram depicting operations performed by an AI confidential proxy in accordance with an example embodiment.

Reference is now made to FIG. 1. FIG. 1 shows a system 100 that includes an AI confidential proxy 110 that functions in or on the edge of an enterprise network 120 between the enterprise network 120 and the Internet 130 where one or more AI services 140-1 and 140-2 are located. In this example, AI service 140-1 is an untrusted AI service and AI service 140-2 is a trusted AI service, the significance of which is described below. The AI confidentiality proxy 110 validates AI data sets containing confidential information, authenticates outside AI services, and permits or denies transfers of AI data sets.

Real-time analysis of data flowing through a network happens constantly and certain signatures even allow encrypted data types to be known. When a confidential data set 150 is found in transit in the network, it is forwarded to the AI confidentiality proxy 110. A number of methods, content filtering, and network analytics could be used to detect the confidential data set 150 and feed it to the AI confidentiality proxy 110. The AI confidentiality proxy 110 itself could be in the form of an agent local to a network device, or centrally located in the enterprise network 120.

The AI confidentiality proxy 110 runs analysis on the confidential data set 150 to definitively ascertain that it contains confidential information. This information can be identified using (now known or hereinafter developed) classification models to predict the type of data in transit and can also leverage historical behavior models to identify data sets in transit that are potentially anomalous. The destination AI service for the confidential data set 150 is authenticated. As shown at 160, if the AI confidential proxy 110 determines that the authenticated destination AI service has permission to receive the confidential data set, then the transaction proceeds. Otherwise, the AI confidential proxy 110 stops the transaction and warnings/notifications can be sent out, as shown at 170. Thus, in the example shown in FIG. 1, when the AI confidential proxy 110 determines that the confidential data set 150 is destined for the trusted AI service 140-2, the AI confidential proxy 110 will permit the transfer of the confidential data set 150 to the trusted AI service 140-2. On the other hand, when the AI confidential proxy 110 determines that the confidential data set 150 is destined for the untrusted AI service 140-1, the AI confidential proxy 110 will deny the transfer of the confidential data set 150 to the untrusted AI service 140-1.

Figure 2:
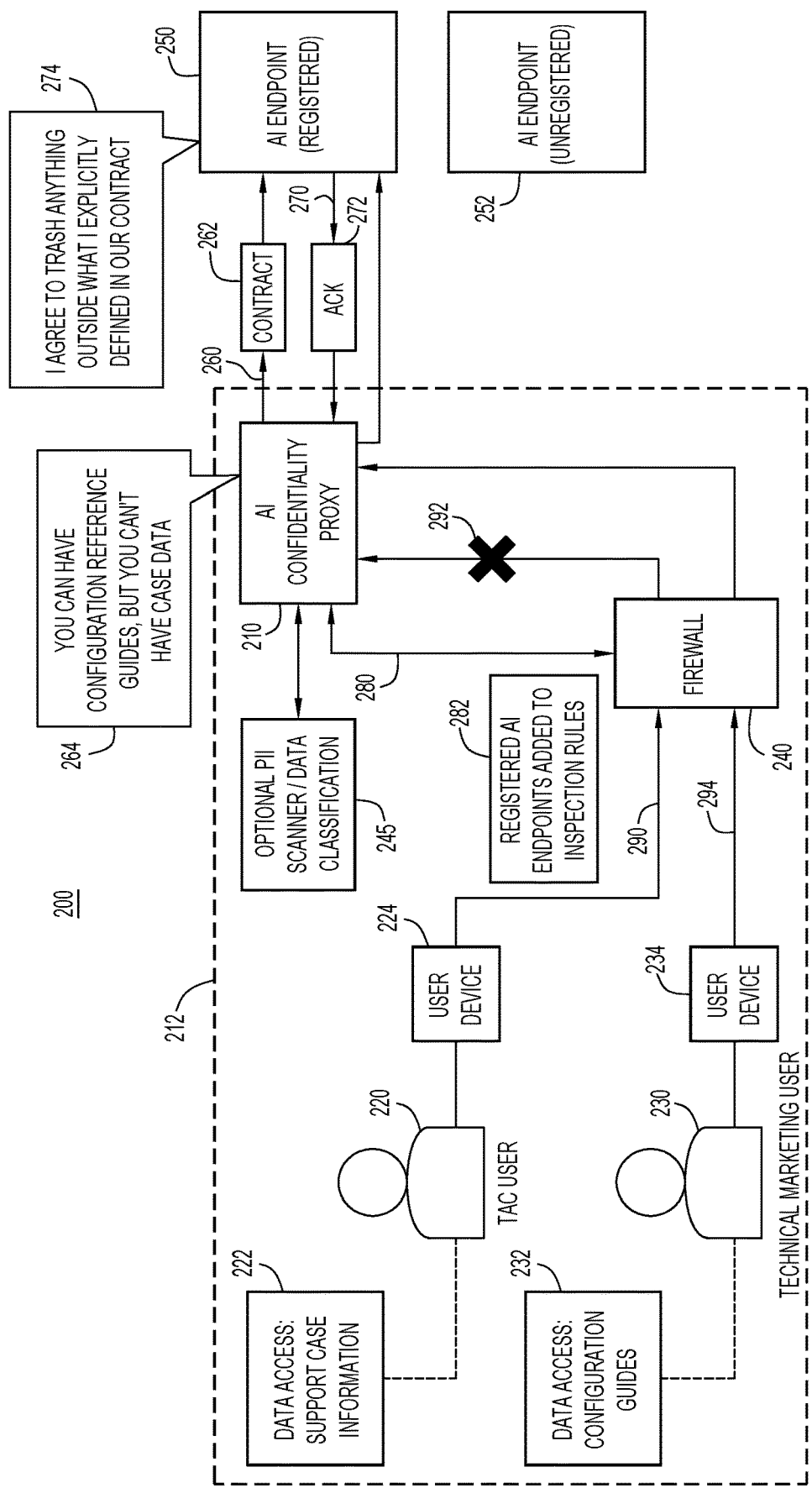
FIG. 2 is a flow diagram that depicts AI confidential proxy data enforcement according to an example embodiment.

Reference is now made to FIG. 2. FIG. 2 shows a more detailed block diagram of a system 200 in which an AI confidentiality proxy 210 brokers a data contract with registered AI endpoints and enforces inspection rules based on the historical usage and access of certain data classifications to users. In FIG. 2, the AI confidentiality proxy 210 operates on behalf of an enterprise network 212 that, as an example, includes a technical assistance center (TAC) user 220 who has access to support case information 222 that may contain confidential information, and a technical marketing user 230 who has access to configuration reference guides 232. TAC user 220 has a user device 224 through which data is obtained and communications are sent and received, and similarly technical marketing user 230 has a user device 234 through which data is obtained and communications are sent and received. The enterprise network 212 may further include a firewall 240 and optional a personal identification information (PII) scanner/data classification entity 245.

The AI confidentiality proxy 210 interacts with AI endpoints outside the enterprise network 212, such as AI endpoints 250 and 252, which may be servers associated with different AI services, as an example. For example, AI endpoint 250 is a "registered" AI endpoint in that it is associated with an authenticated and approved AI service and AI endpoint 252 is an un-registered AI endpoint in that it is associated with an unauthenticated and unapproved AI service.

The AI confidentiality proxy establishes "AI data contract" with an AI endpoint to build a record of registration and definition of data criteria that is acceptable. Rather than implicitly allowing all data to flow to an AI endpoint, definitions are specified where matching criteria can be also used at the AI endpoint level to honor the contract and drop incoming data that looks to be out of specification with the data contract. For example, the AI confidentiality proxy 210 sends to AI endpoint 250 (which is associated with a registered AI service) a message 260 containing information describing the parameters of a data contract 262. For example, as shown at 264 the AI confidentiality proxy 210 may specify in the data contract 262 that the AI endpoint 250 can have access to configuration reference guides 232 but cannot have access to support case information 222. The data contract 262 is a set of information (maintained digitally/electronically) that may contain rules for storage (on what servers the data may be stored), use (how the data may be used by the AI entity), access (what personnel may have access to the data) and privacy of the AI data set.

AI endpoint 250, upon receiving the message 260 containing the data contract 262, is expected to send a message 270 containing an acknowledgment 272 that it will abide by the terms of the data contract 262 in order to be entitled to receive data from the enterprise network 212 through the AI confidentiality proxy 210. For example, the acknowledgment 272 from the AI endpoint 250 may contain information 274 indicating that the AI endpoint 250 agrees to discard anything outside of what is explicitly defined in the data contract 262.

The AI Confidentiality Proxy 210 sends data that, as far as it knows, matches only the criteria that it specifies and uses an acknowledgement from the AI endpoint that the AI endpoint's data classification also agrees before the AI endpoint processes any data that it received from the AI confidentiality proxy 210. That is, AI endpoint 250, as part of the data contract 262, determines whether the AI endpoint 250 is indeed permitted to have access to the received data before it does anything with that data, such as storing the data, providing the data to a user associated with the AI endpoint 250, uses the data for training of AI algorithms, etc. If any data that the AI endpoint 250 receives from the AI confidentiality proxy 210 falls outside of permission parameters of the data contract 262, the AI endpoint 250 will discard that received data, and will not store it or enable it to be accessed by any user associated with the AI endpoint 250.

Based on the data contract that the AI confidentiality proxy 210 establishes for any given AI endpoint, the AI confidentiality proxy 210 may provide content rules to be configured on the firewall 240 (or other context filtering device), so that data of a particular type matching the terms of a data contract or bound for an AI endpoint as a destination is re-routed to the AI confidentiality proxy for additional inspection. It is at this step that optional or additional data classification can be made before the AI confidentiality proxy 210 forwards the data to a registered (trusted) AI endpoint. Thus, in the example of FIG. 2, the AI confidentiality proxy 210, as shown at 280, configures one or more inspection rules 282 on firewall 240, for any registered AI endpoints. As an example, at 290, if TAC user 220 attempts to send support case information 222 to AI endpoint 250, the firewall 240 will detect that the support case information is outside the scope of what is permitted to be sent to the AI endpoint 250 and, at 292, drop the sending of that information, or may direct that send request to the AI confidentiality proxy 210 that will prevent the support case information 222 from being sent to the AI endpoint 250. Conversely, at 294, when technical marketing user 230, sends configuration reference guides 232 to AI endpoint 250, the firewall 240, based on the inspection rules 282, forwards the data to the AI confidentiality proxy 210, which in turn forwards the data for the configuration reference guides 232 to the AI endpoint 250.

Figure 3:
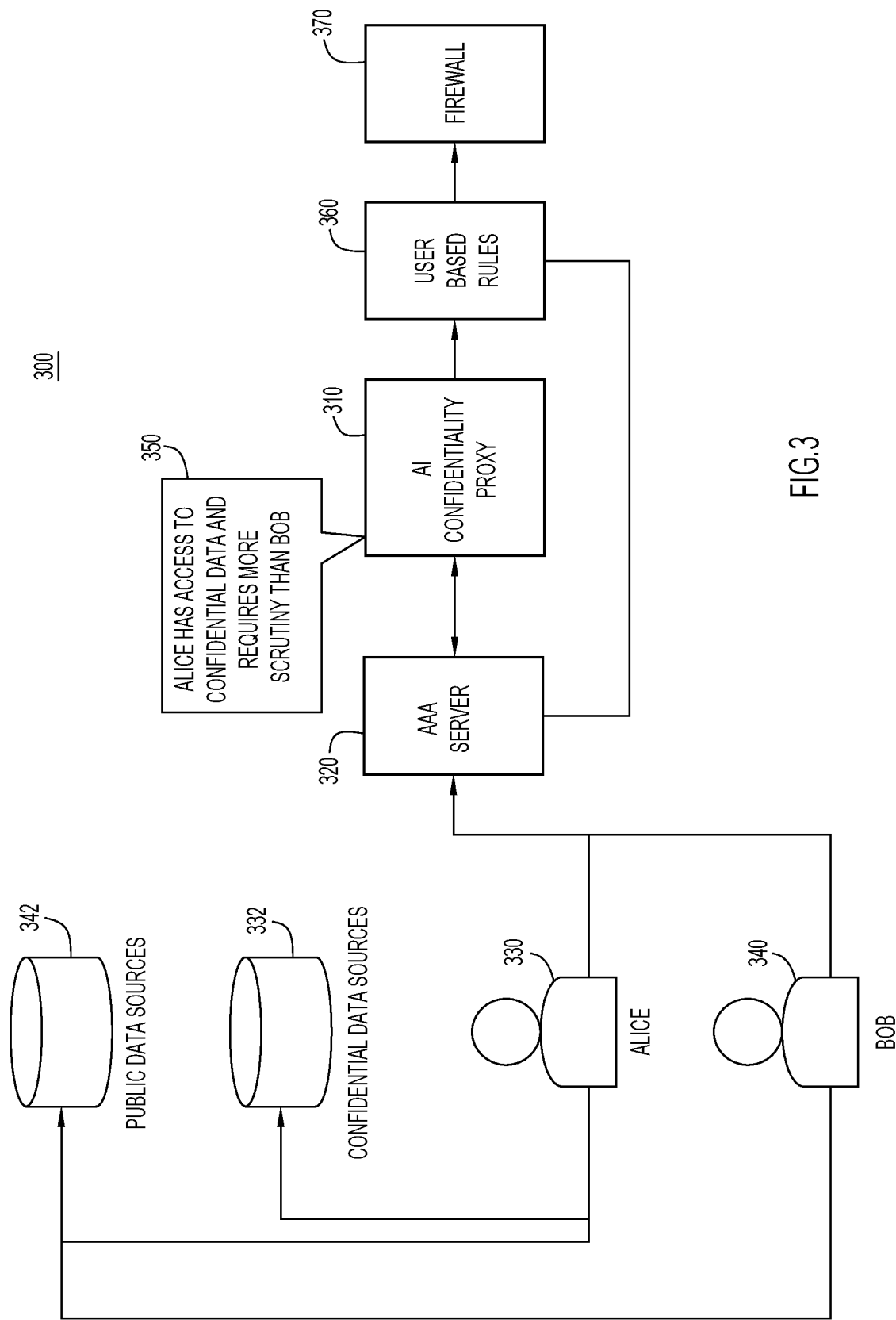
FIG. 3 is a flow diagram illustrating interaction between an AI confidential proxy and an Authentication, Authorization and Accounting (AAA) server, according to an example embodiment.

Turning now to FIG. 3, a flow is now described for interacting with Authentication, Authorization and Accounting (AAA) services to construct user related rules to data available to a user and applying degrees of proxying. FIG. 3 shows a system 300 by which an AI confidentiality proxy 310 interacts with an AAA server 320 to establish a profile of users that are likely to interact with data that would be excluded from an AI data contract. For example, a support engineer user (Alice) 330 that has access to confidential data 332 (e.g., support case data) could be seen as more of a "risk" than a partner or user (Bob) 340 whose data profile indicates access to lower risk, publicly available data 342. Thus, as shown at 350, the AI confidentiality proxy 310 learns, via AAA server 320, that user 330 (Alice) has access to confidential data and requires more scrutiny than for user 340 (Bob). The AI confidentiality proxy 310 may then build a set of user based rules 360 that can, in turn, be configured on a firewall 370. Thus, the techniques depicted in FIG. 3 can be used to "pre-flag" users for explicit use of the AI confidentiality proxy 310 based on their profile, or enforce that all traffic from a particular user should be directed through the AI confidentiality proxy 310.

Figure 4:
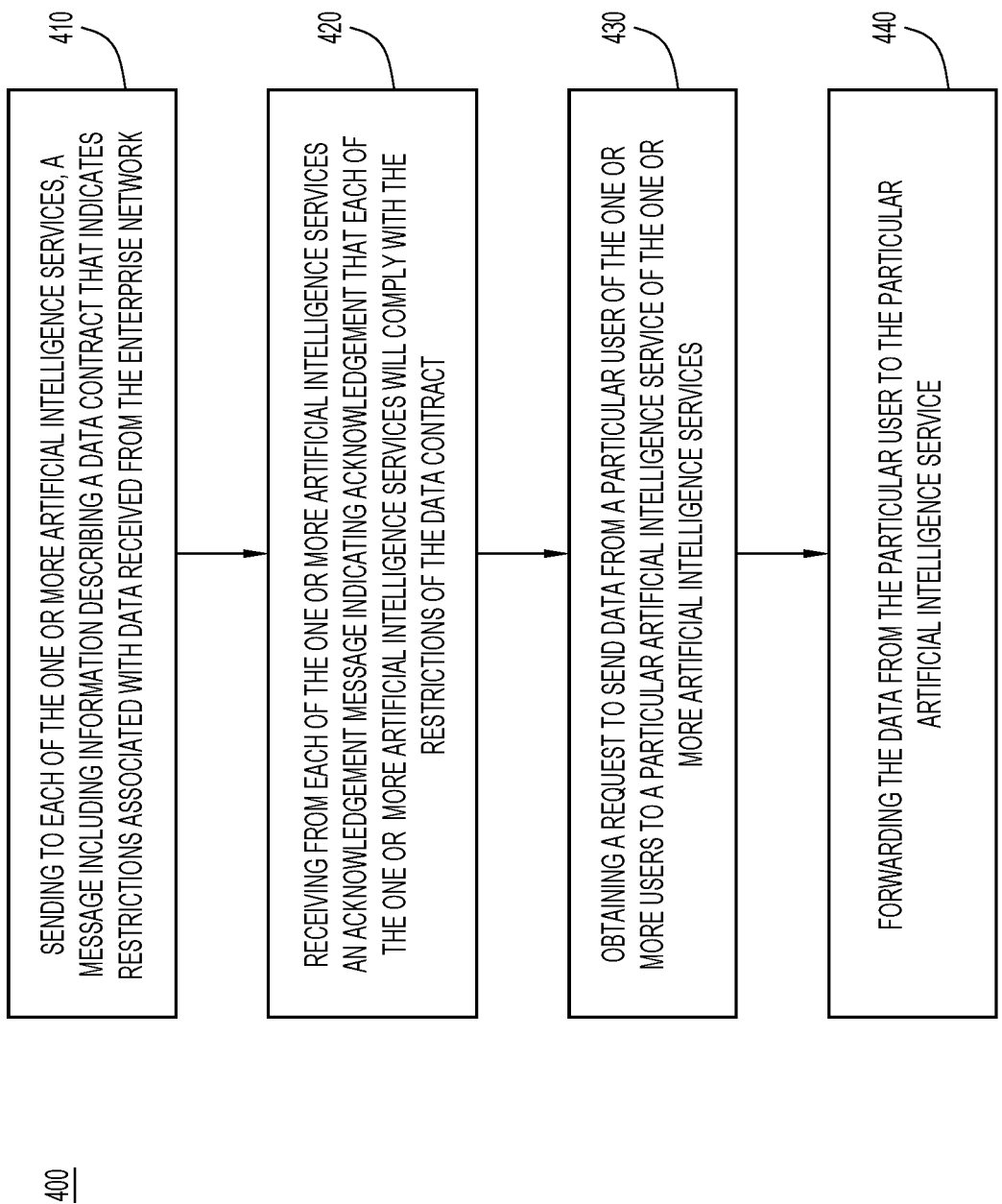
FIG. 4 is a flow chart depicting a method performed by an AI confidential proxy, according to an example embodiment.

Reference is now made to FIG. 4, which depicts a flow chart for a method 400 performed by a proxy that is communication with one or more users in an enterprise network seeking to send data to one or more artificial intelligence services external to the enterprise network. Reference is also made to FIGS. 1-3 for purposes of the description of FIG. 4. At step 410, the method 400 involves sending to each of the one or more artificial intelligence services, a message including information describing a data contract that indicates restrictions associated with data received from the enterprise network. In one example, the data contract includes one or more definitions of matching criteria to be used at the one or more artificial intelligence services and instructions to drop any incoming data that is outside the one or more definitions. The restrictions of the data contract may include rules for storage of the data, how the data may be used by the one or more artificial intelligence services (e.g., whether for ML/AI model training or other analysis) and what type of, or which particular, personnel may (or may not) have access to the data.

At step 420, the method 400 involves receiving from each of the one or more artificial intelligence services an acknowledgement message indicating acknowledgement that each the one more artificial intelligence services will comply with the restrictions of the data contract.

At step 430, the method 400 involves obtaining or intercepting a request to send data from a particular user of the one or more users to a particular artificial intelligence service of the one or more artificial intelligence services.

At step 440, the method 400 involves forwarding the data from the particular user to the particular artificial intelligence service.

As explained above in connection with FIG. 3, the method 400 may also involve receiving from the particular artificial intelligence service a use compliance message indicating that classification of the data by the particular artificial intelligence service agrees with the restrictions of the data contract, prior to the particular artificial intelligence service processes the data.

Further, as described above in connection with FIGS. 2 and 3, the method 400 may include sending to a firewall or filtering device in the enterprise network one or more inspection rules to be configured, based on the data contract, in order to direct to the proxy, data of a particular type matching conditions of the data contract or bound for one of the one or more artificial intelligence services.

The method 400 may further involve the AI confidential proxy determining that the data contains confidential information using one or more classification models and/or one or more historical behavior models to identify data sets in transit that are potentially anomalous, if allowed to leave the enterprise network.

The method 400 may further, as depicted in FIG. 2, authenticating the particular artificial intelligence service, and determining whether the particular artificial intelligence service has permission to receive the data, wherein forwarding the data is performed when it is determined that the particular artificial intelligence service has permission to receive the data.

As depicted in FIG. 3, the AI confidentiality proxy may store, for the one or more users, profile information indicating a likelihood that an associated user would be interacting with sensitive data that should be directed to the proxy for evaluation prior to sending to one of the one or more artificial intelligence services.

In summary, presented herein are techniques for an AI confidentiality proxy that brokers a data contract between AI endpoints and enterprise networks to prevent data leakage and loss. An acknowledgement from an AI endpoint is used in conjunction with a data contract for the purpose of validating data sent from an enterprise network to an AI endpoint. The data contract is used to enforce routing and content policy for users based on the sensitivity profile established per user. It may be further useful to pre-determine if a user is a risk for potential data leakage to an AI training system based on available data access compared to a data contract. Content and inspection rules are generated for other hardware or software devices based on a user's access level to data in conjunction with a defined data contract.

The techniques presented herein provide the ability to define a data type in the contract, as well as instructing the AI endpoint to verify and validate, through its own data classification system, that the data is being handled by the AI endpoint in a manner in compliance with the restrictions of the data contract. The data contract defines the set of information that is permitted to pass from the enterprise network to AI endpoints. The AI confidentiality proxy uses that as a trigger for the types of transactions against which it will write classification rules. Moreover, there is an ongoing acknowledgement with the AI endpoint by which the AI confidentiality proxy is continuously asking AI endpoints if they are receiving data outside of an associated data contract. The data contract may require that the AI endpoint inform the AI confidentiality proxy when it has received data that is outside the permissions/restrictions of a data contract.

Again, the AI confidentiality proxy brokers a data contract between an enterprise network and an AI endpoint/AI service that could use information from an enterprise network to train its model for generative or other purposes. Based on persona information or the type of information that is accessible by a particular persona, the AI confidentiality proxy may push specific rules (content filtering) to other pieces of network hardware based upon the contract that is negotiated with the AI endpoint.

Figure 5:
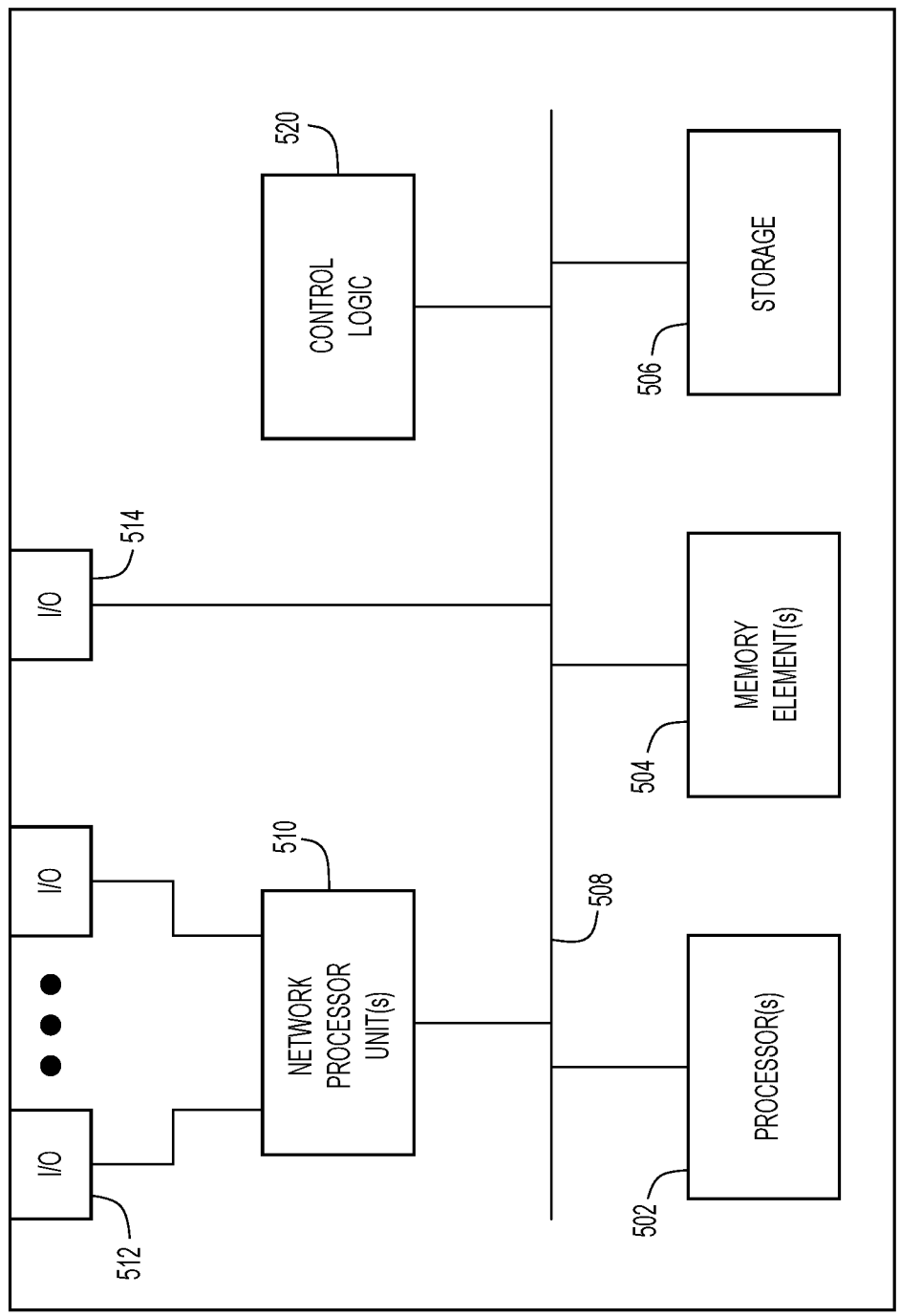
FIG. 5 is a hardware block diagram of a computing or networking device that may perform functions associated with any combination of operations in connection with the techniques depicted and described in connection with FIGS. 1-4, according to various example embodiments.

FIG. 5 is a hardware block diagram of a device (e.g., a computing device, networking device or multiple instances of such computing devices) that may perform functions associated with any combination of operations in connection with the techniques depicted in FIGS. 1-4, according to various example embodiments. It should be appreciated that FIG. 5 provides only an illustration of one example embodiment and does not imply any limitations with regard to the environments in which different example embodiments may be implemented. Many modifications to the depicted environment may be made.

In at least one embodiment, the computing device 500 may be any apparatus that may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520. In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506.

Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a method performed by a proxy that is in communication with one or more users in an enterprise network seeking to send data to one or more artificial intelligence services external to the enterprise network, the method including: sending to each of the one or more artificial intelligence services, a message including information describing a data contract that indicates restrictions associated with data received from the enterprise network; receiving from each of the one or more artificial intelligence services an acknowledgement message indicating acknowledgement that each of the one or more artificial intelligence services will comply with the restrictions of the data contract; obtaining a request to send data from a particular user of the one or more users to a particular artificial intelligence service of the one or more artificial intelligence services; and forwarding the data from the particular user to the particular artificial intelligence service.

In some aspects, the techniques described herein relate to a method, further including: receiving from the particular artificial intelligence service a use compliance message indicating that classification of the data by the particular artificial intelligence service agrees with the restrictions of the data contract, prior to the particular artificial intelligence service processing the data.

In some aspects, the techniques described herein relate to a method, wherein the data contract includes one or more definitions of matching criteria to be used at the one or more artificial intelligence services and instructions to drop any incoming data that is outside the one or more definitions.

In some aspects, the techniques described herein relate to a method, wherein the restrictions of the data contract include rules for storage of the data, how the data may be used by the one or more artificial intelligence services and what type of personnel may have access to the data.

In some aspects, the techniques described herein relate to a method, further including: sending to a firewall in the enterprise network one or more inspection rules to be configured, based on the data contract, in order to direct to the proxy, data of a particular type matching conditions of the data contract or bound for one of the one or more artificial intelligence services.

In some aspects, the techniques described herein relate to a method, further including: determining that the data contains confidential information using one or more classification models and/or one or more historical behavior models to identify data sets in transit that are potentially anomalous, if allowed to leave the enterprise network.

In some aspects, the techniques described herein relate to a method, further including: authenticating the particular artificial intelligence service; and determining whether the particular artificial intelligence service has permission to receive the data, wherein forwarding is performed when it is determined that the particular artificial intelligence service has permission to receive the data.

In some aspects, the techniques described herein relate to a method, further including: storing, for the one or more users, profile information indicating a likelihood that an associated user would be interacting with sensitive data that should be directed to the proxy for evaluation prior to sending to one of the one or more artificial intelligence services.

In some aspects, the techniques described herein relate to an apparatus including: one or more network interfaces that enable communication with one or more users in an enterprise network seeking to send data to one or more artificial intelligence services external to the enterprise network; memory; at least one computer processor coupled to the one or more network interfaces and the memory, the at least one computer processor configured to perform operations including: sending, via the one or more network interfaces, to each of the one or more artificial intelligence services, a message including information describing a data contract that indicates restrictions associated with data received from the enterprise network; receiving, via the one or more network interfaces, from each of the one or more artificial intelligence services an acknowledgement message indicating acknowledgement that each of the one or more artificial intelligence services will comply with the restrictions of the data contract; obtaining a request to send data from a particular user of the one or more users to a particular artificial intelligence service of the one or more artificial intelligence services; and forwarding, via the one or more network interfaces, the data from the particular user to the particular artificial intelligence service.

In some aspects, the techniques described herein relate to an apparatus, wherein the at least one computer processor is further configured to perform operations including: receiving, via the one or more network interfaces, from the particular artificial intelligence service a use compliance message indicating that classification of the data by the particular artificial intelligence service agrees with the restrictions of the data contract, prior to the particular artificial intelligence service processing the data.

In some aspects, the techniques described herein relate to an apparatus, wherein the data contract includes one or more definitions of matching criteria to be used at the one or more artificial intelligence services and instructions to drop any incoming data that is outside the one or more definitions, and wherein the restrictions of the data contract include rules for storage of the data, how the data may be used by the one or more artificial intelligence services and what type of personnel may have access to the data.

In some aspects, the techniques described herein relate to an apparatus, wherein the at least one computer processor is further configured to perform operations including: sending to a firewall in the enterprise network one or more inspection rules to be configured, based on the data contract, in order to direct to the apparatus, data of a particular type matching conditions of the data contract or bound for one of the one or more artificial intelligence services.

In some aspects, the techniques described herein relate to an apparatus, wherein the at least one computer processor is further configured to perform operations including: determining that the data contains confidential information using one or more classification models and/or one or more historical behavior models to identify data sets in transit that are potentially anomalous, if allowed to leave the enterprise network.

In some aspects, the techniques described herein relate to an apparatus, wherein the at least one computer processor is further configured to perform operations including: storing, for the one or more users, profile information indicating a likelihood that an associated user would be interacting with sensitive data that should be directed to the apparatus for evaluation prior to sending to one of the one or more artificial intelligence services.

In some aspects, the techniques described herein relate to one or more non-transitory computer readable storage media encoded with instructions, that when executed by a computer processor of a proxy that is in communication with one or more users in an enterprise network seeking to send data to one or more artificial intelligence services external to the enterprise network, the instructions causing the computer processor to perform operations including: sending to each of the one or more artificial intelligence services, a message including information describing a data contract that indicates restrictions associated with data received from the enterprise network; receiving from each of the one or more artificial intelligence services an acknowledgement message indicating acknowledgement that each of the one or more artificial intelligence services will comply with the restrictions of the data contract; obtaining a request to send data from a particular user of the one or more users to a particular artificial intelligence service of the one or more artificial intelligence services; and forwarding the data from the particular user to the particular artificial intelligence service.

In some aspects, the techniques described herein relate to one or more non-transitory computer readable storage media, wherein the instructions further cause the computer processor to perform operations including: receiving from the particular artificial intelligence service a use compliance message indicating that classification of the data by the particular artificial intelligence service agrees with the restrictions of the data contract, prior to the particular artificial intelligence service processing the data.

In some aspects, the techniques described herein relate to one or more non-transitory computer readable storage media, wherein the data contract includes one or more definitions of matching criteria to be used at the one or more artificial intelligence services and instructions to drop any incoming data that is outside the one or more definitions, and wherein the restrictions of the data contract include rules for storage of the data, how the data may be used by the one or more artificial intelligence services and what type of personnel may have access to the data.

In some aspects, the techniques described herein relate to one or more non-transitory computer readable storage media, further including instructions that cause the computer processor to perform operations including: sending to a firewall in the enterprise network one or more inspection rules to be configured, based on the data contract, in order to direct to the proxy, data of a particular type matching conditions of the data contract or bound for one of the one or more artificial intelligence services.

In some aspects, the techniques described herein relate to one or more non-transitory computer readable storage media, further including instructions that cause the computer processor to perform operations including: determining that the data contains confidential information using one or more classification models and/or one or more historical behavior models to identify data sets in transit that are potentially anomalous, if allowed to leave the enterprise network.

In some aspects, the techniques described herein relate to one or more non-transitory computer readable storage media, further including instructions that cause the computer processor to perform operations including: storing, for the one or more users, profile information indicating a likelihood that an associated user would be interacting with sensitive data that should be directed to the proxy for evaluation prior to sending to one of the one or more artificial intelligence services.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z'. 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed by a proxy that is in communication with one or more users in an enterprise network seeking to send a data to one or more artificial intelligence services external to the enterprise network, the method comprising:
    sending to each of the one or more artificial intelligence services, a message including information describing a data contract that indicates restrictions associated with the data to be received from the enterprise network;
    receiving from each of the one or more artificial intelligence services an acknowledgement message indicating acknowledgement that each of the one or more artificial intelligence services will comply with the restrictions of the data contract;
    obtaining a request, in response to receiving the acknowledgement message, to send the data from a particular user of the one or more users in the enterprise network to a particular artificial intelligence service of the one or more artificial intelligence services; and
    forwarding the data from the particular user to the particular artificial intelligence service.

2. The method of claim 1, further comprising:
    receiving from the particular artificial intelligence service a use compliance message indicating that classification of the data, to be received from the enterprise network, by the particular artificial intelligence service agrees with the restrictions of the data contract, prior to the particular artificial intelligence service processing the data.

3. The method of claim 1, wherein the restrictions of the data contract includes one or more definitions of matching criteria to be used at the one or more artificial intelligence services and instructions for the one or more artificial intelligence services to drop any incoming data that is outside the one or more definitions of matching criteria.

4. The method of claim 1, wherein the restrictions of the data contract include rules for storage of the data, to be received from the enterprise network, usage of the data by the one or more artificial intelligence services and type of personnel that is to have access to the data.

5. The method of claim 1, further comprising:
    sending to a firewall in the enterprise network one or more inspection rules to be configured, based on the data contract, in order to direct to the proxy, data of a particular type matching conditions of the data contract or bound for one of the one or more artificial intelligence services.

6. The method of claim 1, further comprising:
    determining that the data contains confidential information using one or more classification models and/or one or more historical behavior models to identify data sets in transit that are potentially anomalous, if allowed to leave the enterprise network.

7. The method of claim 1, further comprising:
    authenticating the particular artificial intelligence service; and
    determining whether the particular artificial intelligence service has permission to receive the data, wherein forwarding is performed when it is determined that the particular artificial intelligence service has permission to receive the data.

8. The method of claim 1, further comprising:
storing, for the one or more users, profile information indicating a likelihood that an associated user would be interacting with sensitive data that should be directed to the proxy for evaluation prior to sending to one of the one or more artificial intelligence services.

9. An apparatus comprising:
one or more network interfaces that enable communication with one or more users in an enterprise network seeking to send a data to one or more artificial intelligence services external to the enterprise network;
memory; and
at least one computer processor coupled to the one or more network interfaces and the memory, the at least one computer processor configured to perform operations including:
sending, via the one or more network interfaces, to each of the one or more artificial intelligence services, a message including information describing a data contract that indicates restrictions associated with the data to be received from the enterprise network;
receiving, via the one or more network interfaces, from each of the one or more artificial intelligence services an acknowledgement message indicating acknowledgement that each of the one or more artificial intelligence services will comply with the restrictions of the data contract;
obtaining, in response to receiving the acknowledgement message, a request to send data from a particular user of the one or more users in the enterprise network to a particular artificial intelligence service of the one or more artificial intelligence services; and
forwarding, via the one or more network interfaces, the data from the particular user to the particular artificial intelligence service.

10. The apparatus of claim 9, wherein the at least one computer processor is further configured to perform operations including:
receiving, via the one or more network interfaces, from the particular artificial intelligence service a use compliance message indicating that classification of the data by the particular artificial intelligence service agrees with the restrictions of the data contract, prior to the particular artificial intelligence service processing the data.

11. The apparatus of claim 9, wherein the restrictions of the data contract includes one or more definitions of matching criteria to be used at the one or more artificial intelligence services and instructions for the one or more artificial intelligence services to drop any incoming data that is outside the one or more definitions of matching criteria, and wherein the restrictions of the data contract include rules for storage of the data, usage of the data by the one or more artificial intelligence services and type of personnel that is to have access to the data.

12. The apparatus of claim 9, wherein the at least one computer processor is further configured to perform operations including:
sending to a firewall in the enterprise network one or more inspection rules to be configured, based on the data contract, in order to direct to the apparatus, data of a particular type matching conditions of the data contract or bound for one of the one or more artificial intelligence services.

13. The apparatus of claim 9, wherein the at least one computer processor is further configured to perform operations including:
determining that the data contains confidential information using one or more classification models and/or one or more historical behavior models to identify data sets in transit that are potentially anomalous, if allowed to leave the enterprise network.

14. The apparatus of claim 9, wherein the at least one computer processor is further configured to perform operations including:
storing, for the one or more users, profile information indicating a likelihood that an associated user would be interacting with sensitive data that should be directed to the apparatus for evaluation prior to sending to one of the one or more artificial intelligence services.

15. One or more non-transitory computer readable storage media encoded with instructions, that when executed by a computer processor of a proxy that is in communication with one or more users in an enterprise network seeking to send a data to one or more artificial intelligence services external to the enterprise network, the instructions causing the computer processor to perform operations including:
sending to each of the one or more artificial intelligence services, a message including information describing a data contract that indicates restrictions associated with data received from the enterprise network;
receiving from each of the one or more artificial intelligence services an acknowledgement message indicating acknowledgement that each of the one or more artificial intelligence services will comply with the restrictions of the data contract;
obtaining, in response to receiving the acknowledgement message, a request to send the data from a particular user of the one or more users in the enterprise network to a particular artificial intelligence service of the one or more artificial intelligence services; and
forwarding the data from the particular user to the particular artificial intelligence service.

16. The one or more non-transitory computer readable storage media of claim 15, wherein the instructions further cause the computer processor to perform operations including:
receiving from the particular artificial intelligence service a use compliance message indicating that classification of the data by the particular artificial intelligence service agrees with the restrictions of the data contract, prior to the particular artificial intelligence service processing the data.

17. The one or more non-transitory computer readable storage media of claim 15, wherein the restrictions of the data contract includes one or more definitions of matching criteria to be used at the one or more artificial intelligence services and instructions for the one or more artificial intelligence services to drop any incoming data that is outside the one or more definitions of the matching criteria, and wherein the restrictions of the data contract include rules for storage of the data, usage of the data by the one or more artificial intelligence services and type of personnel that is to have access to the data.

18. The one or more non-transitory computer readable storage media of claim 15, further comprising instructions that cause the computer processor to perform operations including:
sending to a firewall in the enterprise network one or more inspection rules to be configured, based on the data contract, in order to direct to the proxy, data of a particular type matching conditions of the data contract or bound for one of the one or more artificial intelligence services.

19. The one or more non-transitory computer readable storage media of claim 15, further comprising instructions that cause the computer processor to perform operations including:

determining that the data contains confidential information using one or more classification models and/or one or more historical behavior models to identify data sets in transit that are potentially anomalous, if allowed to leave the enterprise network.

20. The one or more non-transitory computer readable storage media of claim 15, further comprising instructions that cause the computer processor to perform operations including:

storing, for the one or more users, profile information indicating a likelihood that an associated user would be interacting with sensitive data that should be directed to the proxy for evaluation prior to sending to one of the one or more artificial intelligence services.

* * * * *